(No Model.)
C. C. QUIGLEY.
RAKE.
No. 524,215. Patented Aug. 7, 1894.
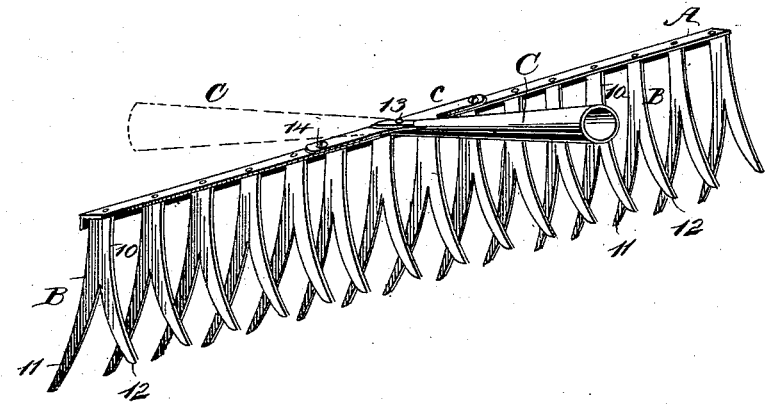
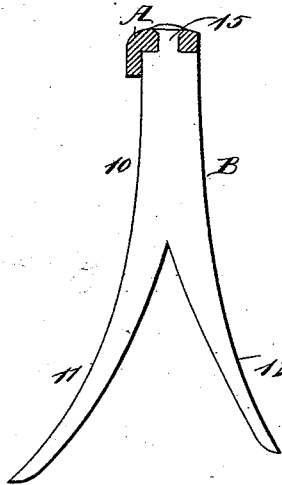
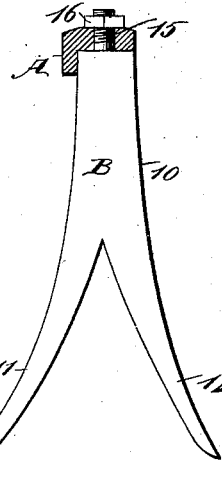
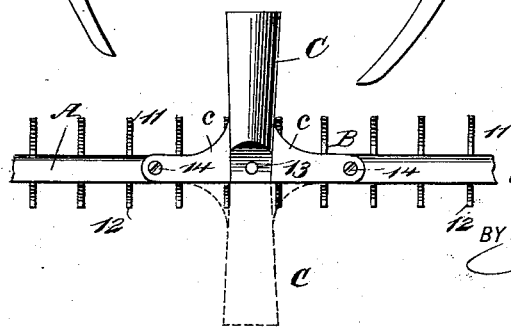
WITNESSES:
INVENTOR
ATTORNEYS

UNITED STATES PATENT OFFICE.

CHARLES C. QUIGLEY, OF HAVANA, NEW YORK, ASSIGNOR TO HIMSELF AND BAXTER T. SMELZER, OF SAME PLACE.

RAKE.

SPECIFICATION forming part of Letters Patent No. 524,215, dated August 7, 1894.

Application filed January 17, 1894. Serial No. 497,123. (No model.)

*To all whom it may concern:*

Be it known that I, CHARLES C. QUIGLEY, of Havana, in the county of Schuyler and State of New York, have invented a new and useful Improvement in Rakes, of which the following is a full, clear, and exact description.

My invention relates to an improvement in rakes, and particularly to an improvement in garden and lawn rakes, and it has for its object to combine in one article a rake which may be employed for garden purposes as effectually as an ordinary or single garden rake, and which may likewise be employed for removing leaves or other foreign matter from a lawn, and whereby when used for the latter purpose the rake will not mar the lawn in any manner.

Another object of the invention is to provide a means whereby the handle of the rake may be shifted so that the rake may be used upon either side, and to provide a means whereby the rake will be of exceedingly simple, durable and economic construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the improved rake. Fig. 2 is a partial plan view thereof. Fig. 3 is a transverse section through the rake head, illustrating one of the teeth in side elevation, and one manner of securing a tooth to the head; and Fig. 4 is a view similar to Fig. 3, wherein a slight modification is shown in the means for attaching the teeth to the head.

In carrying out the invention the rake head A, is made preferably of angle iron, that is to say, iron substantially L-shaped in cross section, and the head is so placed that one member will be horizontally located, while the other will be vertically disposed.

The main feature of this invention consists in the construction of the teeth B. The teeth may be connected at the top and made in pairs, but preferably they are constructed as shown in the drawings, in which each tooth is independent of the others. Each tooth comprises a body portion 10, which body is bifurcated or forked at its lower end, forming thereby two oppositely-curved teeth or members, designated respectively as 11 and 12. These members or working surfaces of a tooth are curved, one more than the other, and the more decidedly curved member or working surface is longer than the member or working surface less decidedly curved; and each member or working surface at its lower end is sharp or pointed at its outer or front face, while the inner or rear lower surface and lower extremity of each member or working surface is rendered more or less cylindrical, as is shown in both Figs. 3 and 4.

The concaved surfaces of both members 11 and 12 of the body of a tooth are the outer surfaces of the members, and the longer members 11, are adapted for use in raking the soil, or for other purposes to which the teeth of a garden rake are applied, while the shorter members of the teeth are adapted for the purpose of raking or cleaning a lawn.

The head is provided with a handle socket C, and the said socket is provided at one end with lateral arms or extensions *c*, extending at angles in opposite directions from the socket; and the socket is pivotally attached to the central portion of the head by means of a rivet 13, loosely entered therein and secured to the horizontal member of the head, which rivet forms a pivot point for the socket C; and at each end of the extensions *c* of the socket, apertures are made for the reception of screws 14 or like devices, which are adapted to be passed through suitable openings in the rake head, and are provided with nuts at their lower ends. In this manner the socket may be made to readily extend over that portion of the head at which the shorter members of the teeth are located, or over that portion of the head upon which the longer members of the teeth are placed.

The teeth may be secured to the head in various ways, as for example as shown in Fig. 3, a stud 15, may be formed integrally with the upper portion of the body of a tooth, which stud is passed upward through a suitable aperture made in the horizontal member of the rake head, and the top or outer end of the stud is flattened, forming a head which will maintain the tooth firmly in place, the teeth being so placed that that edge of the body at which the longer member is located will engage with the vertical member of the rake head; or, as shown in Fig. 4, the stud 15 located upon the tooth body may be threaded, and after being passed through the head of the rake be provided with a nut 16 at its upper end.

When the handle of the rake is made to extend beyond that side of the head at which the longer members of the teeth are placed, the rake may be used for ordinary gardening purposes. When, however, the rake is to be used for cleaning a lawn the handle is made to extend beyond the opposite side of the head, as shown in Fig. 1, and the cylindrical surfaces of the longer teeth when made to rest upon the lawn will hold the working or lawn members 11 of the teeth at an elevation from the lawn, the elevation being just sufficient to permit the teeth to engage with and remove leaves or other foreign matter from the lawn without engaging with the roots of the grass, or injuring the grass adjacent to its roots. As the longer members of the teeth present their cylindrical surfaces to the grass, they may be readily slid over the lawn without injury to it.

Having thus fully described my invention, I claim as new and desire to secure by Letters Patent—

1. A rake tooth comprising the vertical body 10 bifurcated at its lower end thereby forming the downwardly extending long and short members 11, 12; said members being spaced apart throughout their length and diverging at their lower ends, substantially as herein described.

2. The combination with the rake head, of the rake teeth depending therefrom and each having downwardly extending long and short members 11, 12 diverging at their lower ends, and a reversible handle adapted to be secured to the rake head at either side at about right angles to the vertical plane of the teeth, substantially as herein described.

3. A rake comprising the head 15 of angle iron, provided with a series of apertures in its horizontal member, the teeth B having shanks or bodies 10 provided with studs extending through the said apertures, the edges of the shanks 10 resting against the vertical flange of the said head; the lower ends of the shanks 10 being bifurcated and extending downwardly, thereby forming the diverging long and short members 11, 12 and the reversible handle socket secured removably to the said head, substantially as herein described.

CHARLES C. QUIGLEY.

Witnesses:
J. FRED ACKER,
C. SEDGWICK.